3,487,211
METHOD AND APPARATUS FOR RADIOACTIVITY WELL LOGGING UTILIZING THE DECLINE OF THE EPITHERMAL NEUTRON POPULATION
Arthur H. Youmans, Houston, Tex., assignor to Dresser Industries, Inc., Dallas, Tex., a corporation of Delaware
Filed June 2, 1965, Ser. No. 460,667
Int. Cl. G01t *1/16;* H01j *39/00*
U.S. Cl. 250—83.3                                              10 Claims

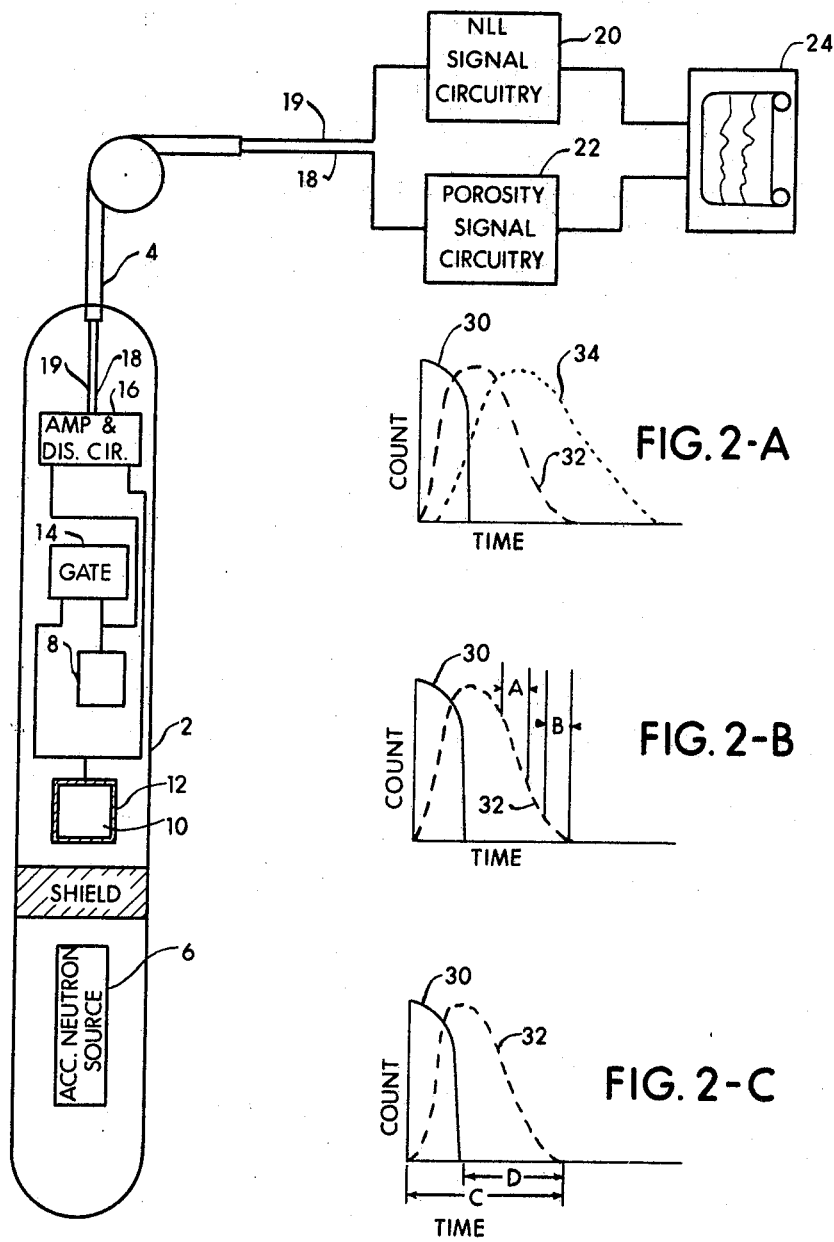

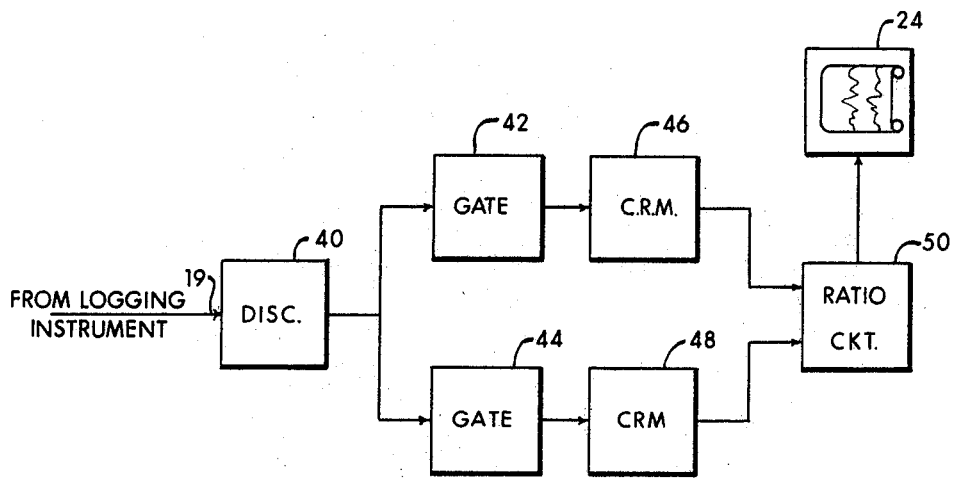
FIG. 3-A
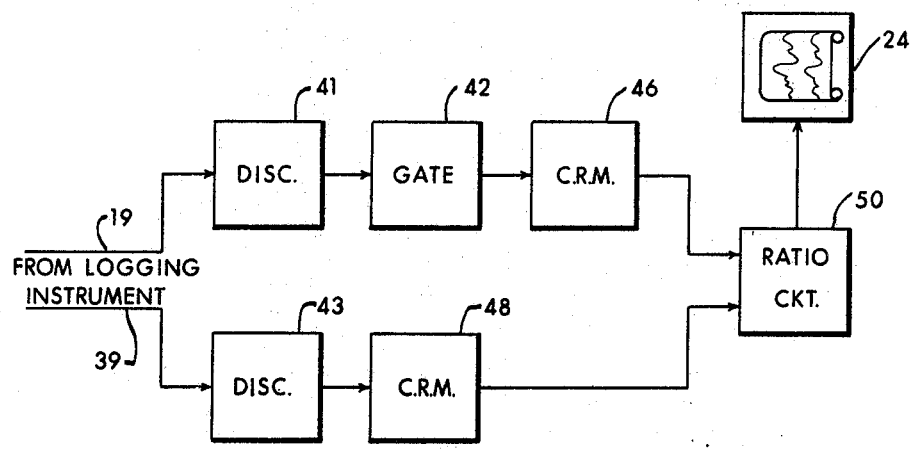
FIG. 3-B
INVENTOR.
ARTHUR H. YOUMANS
BY
*E. F. Bard*
ATTORNEY United States Patent Office 3,487,211
Patented Dec. 30, 1969

ABSTRACT OF THE DISCLOSURE

Epithermal detecting and counting circuitry provides determination of the rate of decline of epithermal neutrons emanating from the formation surrounding a borehole. Means are also provided for determining the ratio of the epithermal neutrons detected during one time interval as compared to the epithermal neutrons detected during a second time interval. Means are also provided to indicate the relationship between the total number of epithermal neutrons as compared to the epithermal neutrons detected during a given time interval. Means are also provided for indicating the relationship between the number of fast neutrons during a given time period as compared to the number of epithermal neutrons counted during a given time period.

---

This invention relates to methods and apparatus for radio-activity well logging, and more particularly relates to improved methods and apparatus for measuring the porosity of subsurface earth formations.

It is now well known that oil and gas is found in subsurface earth formations, and that boreholes are drilled into these formations for the purpose of capturing these fluids. It is also well known that the fluid-bearing formations are not ordinarily immediately apparent, and that various surveying or logging techniques are usually employed to identify the formations which contain the oil or gas sought to be captured.

What is not so well known is that there is no method or apparatus presently commercially available which is capable or providing a direct indication of oil or gas. Instead, all methods and apparatus now in use are directed to the measurement of one or more lithological characteristics, of the earth substances traversed by the borehole, and these lithological measurements must therefore be interpreted to determine the probability that oil or gas may be present in commercial quantities in a particular formation of interest. For example, it is clearly apparent that the porosity of an earth formation is directly related to the likelihood that the formation may contain any fluid at all, and that only a relatively very porous formation is therefore capable of holding oil or gas in commercial quantities.

Various radioactivity well logging techniques have long been used to provide an indication of the presence of fluid in a subsurface formation. Basically, all of these techniques involve irradiating the formation of interest with neutrons, and then measuring the moderating effect had on the neutrons by the formation substances by measuring either the scattered neutrons or the secondary gamma rays which return to the borehole from the irradiated formation. It is well known that all common earth fluids are hydrogenous in composition, and that hydrogen has a relatively large capture cross section for slow neutrons. Thus, a measurement of the number of slow neutrons emanating from one irradiated formation, as compared to the other formations traversed by the borehole, will furnish a qualitative measurement of the hydrogeneity of that formation as compared with the other. Likewise, a measurement of the number of gamma rays produced by thermal neutron capture reactions will furnish a similar qualitative indication of hydrogeneity.

In making any such measurement it is, of course, desirable to reduce or to eliminate as many variables as possible. Thus, it has become desirable to use an artificial source of neutrons such as a deuterium-tritium ion accelerator, instead of a so-called "natural" neutron source such as an encapsulated mixture of radium and beryllium, because encapsulated neutrons sources emit neutrons of various energies, and an accelerator source emits neutrons having a single predetermined energy. However, the typical ion accelerator is an extremely sensitive device, and its operating efficiency is often adversely affected by environmental conditions which cannot normally be provided against or often even recognized. Thus, the rate of neutron output of an accelerator may fluctuate at different locations in a borehole, and the number of neutrons or gramma rays detected may fluctuate as much from fluctuations in source-output as from variations in the hydrogeneity of the various formations irradiated.

These disadvantages of the prior art are overcome with the present invention, and novel methods and apparatus are provided for measuring the porosity of subsurface earth formations without regard for any fluctuations in neutron output which may occur.

Accordingly, it is an object of the present invention to provide novel radioactivity methods and apparatus for making a porosity log of subsurface earth formations which is independent of the intensity of the neutron output from the neutron source.

It is also an object of the present invention to provide novel radioactivity methods and apparatus for measuring the porosity of neutron-irradiated earth formations independently of the output of the neutrons source providing such irradiation.

It is further an object of the present invention to provide novel radioactivity methods and apparatus for measuring the rate of decline of thermal neutrons in a selected earth formation, and for making a correlative measurement of the porosity of said formation independently of the number of said thermal neutrons.

It is a specific object of the present invention to provide a novel method of radioactivity well logging comprising the steps of irradiating a subsurface earth formation with a pulse of fast neutrons, detecting and counting a representative number of epithermal neutrons emanating from said formation during a preselected time interval, and determining a function of the rate of decline of said epithermal neutrons emanating from said formation during said preselected interval.

It is also a specific object of the present invention to provide novel apparatus for radioactivity well logging, said novel apparatus comprising a source of fast neutrons including means for pulsing said source, detector means for detecting and counting epithermal neutrons during a preselected time interval, and computing means for determining a function of the rate of decline of epithermal neutrons detected by said detector means during said preselected time interval.

These and other objects and features of the present invention will be apparent from the following detailed description, wherein reference is made to the accompanying drawings.

FIGURE 1 is a functional representation of a well logging system incorporating one form of the present invention.

FIGURE 2–A is a functional diagram showing the relative occurrence and decline of fast, epithermal, and thermal neutron populations produced in a medium by a burst of fast neutrons.

FIGURE 2–B is a functional representation of the portions of an epithermal neutron population decline which are measured to obtain the rate of such decline.

FIGURE 2–C is a functional representation of a detection sequence different from that depicted in FIGURE 2–B.

FIGURE 3–A is a functional representation of measurement circuitry used in one form of the present invention.

FIGURE 3–B is a functional representation of another form of measurement circuitry used in the present invention.

As will hereinafter be apparent, the advantages of the present invention are preferably obtained with conventional radioactivity well logging apparatus having a source of fast or high energy neutrons, a radiation detector which is responsive substantially only to epithermal neutrons, and pulsing and gating circuitry for causing the source to emit fast neutrons in controlled bursts or pulses at a preselected frequency. The gating circuitry is also preferably adapted, either to render the detector responsive to radiation only during selected time periods, or else to select for measurement only certain predetermined time-dependent portions of the output of the detector.

Any fast neutron source which is capable of providing a pulsed neutron output may be used in the present invention. However, the only source found practical for well logging purposes is the deuterium-tritium accelerator which is described in U.S. Patent No. 2,689,918, and such a source is preferably controlled by pulsing techniques such as those disclosed in the copending patent application S.N. 259,073, which was filed by A. H. Youmans and E. C. Hopkinson on Feb. 18, 1963.

Any radiation detector may be used which is primarily responsive only to epithermal neutrons. As used herein, neutrons having energies greater than thermal neutrons but less than one hundred electron volts will be considered to be epithermal neutrons, and neutrons having energies above one hundred electron volts will be referred to as fast neutrons. Accordingly, the radiation detector should preferably be responsive only to neutrons within this arbitrarily defined epithermal range, and such a detector may be of the type disclosed in U.S. Patent No. 3,032,658. Suitable fast-response switching circuitry for such a detector may be found disclosed in the copending patent application 248,568, which was filed Dec. 31, 1962, by E. C. Hopkinson.

A new logging service has recently been introduced commercially to the petroleum industry, which service utilizes methods and apparatus for sequentially bombarding subsurface earth formations with bursts or pulses of fast neutrons which thereafter slow down and become successive "populations" of thermal neutrons. These neutron populations then decline as the thermal neutrons enter into capture reactions with the nuclei of the formation substances, and methods and apparatus for measuring the rate of decline of these thermal neutron populations are disclosed in the copending patent application S.N. 292,927, which was filed July 5, 1963, by A. H. Youmans.

It should be apparent that when the neutron source generates a pulse of fast neutrons, these neutrons decline rapidly in energy to form an epithermal neutron population. The epithermal neutron population rises to a peak as the fast neutrons slow down, and thereafter the epithermal neutron population declines away as the epithermal neutrons slow down to thermal energy. It should be noted, however, that the epithermal neutron population dies away largely because its member neutrons lose energy to become thermal neutrons, whereas the thermal neutron population dies away because the thermal neutrons are gradually captured. In other words, the epithermal neutron population declines because the epithermal neutrons engage in one or more elastic scattering reactions with the formation nuclei, whereby they lose energy and become thermal neutrons. On the other hand, the thermal neutron population declines because the thermal neutrons enter into capture reactions with the formation nuclei.

The rate at which the thermal neutrons are captured by the formation nuclei is a function of the macroscopic capture cross section of the formation material, whereas the rate at which the epithermal neutron population declines is a function of the microscopic elastic scattering cross section of the formation material. The lifetime of an epithermal neutron in an earth formation is largely dependent upon the hydrogeneity of the formation, and therefore the rate of decline of an epithermal neutron population is a functional indication of the porosity of the formation. Such a porosity measurement is especially useful, if it is made in correlation with a measurement of the rate of decline of a thermal neutron population in the same formation. Thus, the present invention provides an especially desirable "companion log" for the logging measurement described in the aforementioned Youmans S.N. 292,927 application.

Accordingly, it will be apparent that if two formations are each irradiated with a burst of fast neutrons, a measurement of the number of epithermal neutrons which thereupon emanate from each of the respective irradiated formations will theoretically provide an indication of the porosity of one formation as compared to the other. Furthermore, if the two measurements are compared with the count obtained when a formation of predetermined porosity is similarly irradiated, the counts obtained with respect to the two unknown formations would provide a substantially quantitative measurement of the porosity of each formation.

The accuracy of the foregoing measurement is dependent upon many factors, however, not the last of which is the stability of the accelerator source of fast neutrons. Clearly, if one formation is irradiated with a different number of neutrons, then the number of resultant epithermal neutrons will be different for this reason alone. As is well known in the industry, the typical deuteriumtritium accelerator is likely to be unstable to a greater or less degree, and its intensity of output often fluctuates sharply for reasons which have nothing whatsoever to do with lithology of the surrounding formations.

In the prior art exemplified by the aforementioned S.N. 292,927 application, inaccuracies in the measurements are sought to be minimized by pulsing the accelerator at a pulse rate of 500–5,000 pulses per second, and to measure the epithermal neutrons in each of the corresponding epithermal populations created in the formations by these fast neutron pulses. Accordingly, fluctuations in neutron output from the accelerator are presumably minimized by observing what may be referred to as the "average" number of epithermal neutrons emanating from the formations as the well logging tool is passed through the borehole.

Such a technique is effective if fluctuations in neutron output from the accelerator are relatively short-lived, since a substantial change (usually a reduction) in neutron output will be difficult to "average out" if it continues over a period which is as little as a few seconds in duration. Unfortunately, such long enduring fluctuations are common, and thus a better solution to this problem has long been sought.

These disadvantages are overcome with the present invention, which provides novel methods and apparatus for measuring the porosity of a formation in a manner which is completely independent of the number of fast neutrons emitted by the accelerator during any one or more of these fast neutron pulsations. Thus the present invention is directed to a measurement of a function of the rate of decline of each epithermal neutron population, rather than the number of epithermal neutrons in each such population of epithermal neutrons. In particular, the present invention preferably includes means and method for counting the number of epithermal neutrons emanating from the formation during one preselected time interval following each fast neutron pulse, in addition counting the number of epithermal neutrons emanating therefrom during another preselected time interval following the same fast neutron pulse, and then determining or computing a predetermined function of these two counts—such as their ratio—in order to obtain an indication of porosity which is independent of the number of fast neutrons in the irradiating burst emitted by the accelerator.

The first preselected time interval may be of any duration, and may even stretch from the beginning of one fast neutron pulse to the beginning of the next succeeding fast neutron pulse. Alternatively, this first interval may be chosen so as to begin on or about the time when the epithermal neutron population reaches a peak, and may terminate on or before—or even shortly after—the instant when the last epithermal neutron may be expected to disappear. The second preselected time interval may be a portion of the first interval. For example, if the first interval runs from fast neutron pulse to fast neutron pulse, then the second interval is preferably chosen so as to encompass only a substantial portion of the period during which the epithermal neutron population declines away from its peak. On the other hand, the first interval may be chosen so as to encompass the initial decline period of the epithermal neutron population, and the second time interval (which should be equal in duration to the first interval) may be chosen so as to encompass a later non-overlapping portion of the decline period of the aforementioned epithermal neutron population.

In another useful form of the present invention, the epithermal neutrons are counted during a period which preferably encompasses only the decline period of the epithermal neutron population, and then a ratio or other functional relationship is computed between the epithermal total and the number of fast neutrons composing the related fast neutron burst or pulse from the accelerator. It is now common practice to monitor the accelerator output all during any logging operation. Therefore, a measurement of the total fast neutrons in each accelerator pulse is relatively available to provide the ratio or other function sought to be derived.

The aforementioned detection time intervals may be established by gating the epithermal neutron detector on and off according to a predetermined gating sequence. Alternatively, the detector may be kept continually responsive and the detector signal may be interrupted or gated on or off as desired. Thus, in one form of the present invention the epithermal neutron detector is maintained in a continually responsive condition, but its output signal is passed through a gating circuit which periodically applies the output signal to a count rate meter, in synchronism with the pulsing accelerator, to count only the epithermal neutrons which are detected during a selected time interval following each fast neutron pulse. The total or continuous epithermal neutron detector signal is also simultaneously applied in toto to a second different count rate meter, and the outputs of the two count rate meters are used to provide the ratio or other preselected functional relationship sought to be obtained.

Referring now to FIGURE 1, there may be seen a functional representation of a subsurface logging instrument 2 which is adapted to be passed through a well bore, and which is supported by means of a logging cable 4. The instrument 2 contains a fast neutron source which is preferably a D–T accelerator of the type hereinbefore described, a first detector 8 which is arranged and adapted to provide an indication of the decline rate of a thermal neutron population as hereinbefore described, and a second detector 10 which is primarily responsive to epithermal neutrons.

The first detector 8 may be responsive to either thermal neutrons or gamma rays. As explained in the aforementioned S.N. 292,927 application, however, it is preferable that the first detector 8 be responsive to gamma rays produced by capture reactions between neutrons from the accelerator source 6 and nuclei of the earth substances around the well bore. The second detector 10 may be any type of radiation detector which is primarily responsive to epithermal neutrons, rather than either fast or thermal neutrons. Thus, the second detector 10 may be a conventional thermal neutron detector surrounded by a jacket 12 of cadmium or some other material having the ability to capture or block out thermal neutrons together with the ability to detect epithermal neutrons, or to slow epithermal neutrons to thermal energy. Thus, all neutrons reaching the jacket 12 at thermal energy will be captured and will not register on the second detector 10. On the other hand, epithermal neutrons will penetrate the jacket 12, and may be detected by the second detector 10. Fast neutrons and gamma rays will, of course, pass through the jacket 12 and the second detector 10 without registering. The capacity of the second detector 10 to register only epithermal neutrons emanating from adjacent earth materials will obviously depend substantially upon the thickness of the jacket 12, and the proper thickness may be determined experimentally.

The first detector 8 is connected to suitable gating circuitry 14 which functions, preferably in synchronism with pulsation of the accelerator source 6, to render the first detector 8 responsive during one or more preselected time intervals following the production of each fast neutron burst from the accelerator source 6. As shown in FIGURE 1, the second detector 10 may be similarly connected to the gating circuit 14 for similar purposes. However, as has hereinbefore been explained, the second detector 10 may instead be operated continuously, and its output signal may be gated.

The output signals from both detectors 8 and 10 are preferably passed independently through standard amplifier and discriminator circuitry 16. From there, the detector signals pass by separate channels to the surface, for example, by way of two separate conductors 18 and 19 in the logging cable 4. At the surface, the conductor 18 which carries the output signal from the first detector 8, connects that signal to circuitry hereinafter referred to as "NLL signal circuitry" 20. Conductor 19, which carries the output signal from the second detector 10, is connected to circuitry hereinafter referred to as the "porosity signal circuitry" 22. It is the function of the NLL signal circuitry 20 to compute the ratio of the number of capture gamma rays detected during the first of two preselected detection intervals, to the number of capture gamma rays detected during the second such detection interval, and to generate a voltage which is representative of such ratio. This output voltage from the NLL signal circuitry 20 is then applied to a conventional recorder 24.

It is the function of the porosity signal circuitry 22 to receive the output signal from the second detector 10, and in response thereto to generate a voltage which is functionally related in some manner to the porosity of the earth formation adjacent the accelerator source 6 and the second detector 10. For example, if the second detector 10 is cycled by the gating circuit 14 in a manner similar to the first detector 8, then the porosity signal circuitry 22 may be set to obtain a ratio of the number of epithermal neutrons detected during two preselected time intervals sequentially following each fast neutrons burst. This ratio will be indicative of the decline rate of the epithermal neutron population created by the fast neutron burst, and thus will not only be directly related to the porosity of the adjacent earth material, but will also be independent of the number of fast neutrons in the initiating burst produced by the accelerator source 6. The voltage output from the porasity signal circuitry 22 may either be recorded by the recorder 24 separately from the signal produced by the NLL signal circuit 20, or it may be used to modulate or "correct" the voltage signal generated by the NLL signal circuitry 20 with respect to the porosity of the formation under investigation.

Referring now to FIGURE 2–A, there may be seen a pulse diagram of a fast neutron burst curve 30 emitted by the accelerator source 6 depicted in FIGURE 1, and which may have a preselected duration such as from 1–5 microseconds or even longer. The fast neutrons emitted by the accelerator source 6 bombard and create a so-called "fast neutron population" in the adjacent earth materials, where they very rapidly slow down to epithermal energy. Although the lifetime of a fast neutron population is theoretically slightly longer than the pulse time of the accelerator source 6, the fast neutrons slow down so rapidly that the lifetime of the fast neutron population in the irradiated formation may be assumed to be coincident with the lifetime of the neutron burst from the accelerator source 6.

When a fast neutron slows down to the epithermal range of energies, it ceases to be a "fast" neutron and becomes, instead, an "epithermal" neutron. All of the fast neutrons in the fast neutron population do not slow down simultaneously, of course, and so the epithermal neutron population curve 32 rises to a peak more or less coincidently with the disappearance of the so-called fast neutron population. However, the epithermal neutron population decays or declines away as the individual epithermal neutrons slow down to thermal energy. As the epithermal neutrons "disappear" by becoming thermal neutrons, the epithermal neutron population in effect functions to create a thermal neutron population in the same manner that the fast neutron population "created" the epithermal neutron population. This is represented in FIGURES 2–A by the fact that the epithermal curve 32 declines as the thermal neutron population curve 34 increases.

The thermal neutron population as represented by curve 34 is relatively long-lived, with respect to the lifetime of the epithermal neutron population, and may last 200 microseconds or longer in an earth formation having a low macroscopic capture cross section. Similarly, the epithermal neutron population as represented by curve 32 is relatively long-lived, with respect to the lifetime of the fast neutron population, and may last as long as 100 microseconds or longer in an earth formation having a low macroscopic elastic scattering cross section. On the other hand, the epithermal neutron population may disappear within 20 microseconds, or even less, in an earth formation which is heavily saturated with oil or water, and which consequently has a very high macroscopic elastic scattering cross section.

Referring now to FIGURE 2–B, there may be seen a pulse diagram similar to that depicted in FIGURE 2–A, and showing the portions of the curve 32 representing the epithermal neutron population which coincide with the detection intervals A and B provided for by the operation of gate 14 depicted in FIGURE 1. In other words, the gate 14 operates to activate the normally non-responsive second detector 10 during two preselected and equal time intervals following each fast neutron pulse from the accelerator source 6. The slope of the decline portion of curve 32 may be assumed to be directly representative of the decline rate of each epithermal neutron population so created, irrespective of how many fast neutrons were in each such burst from the accelerator source 6. Thus, a computation of the ratio of the epithermal neutrons counted during interval B, to the number counted during interval A, will be directly related to the decline rate of the epithermal population and will provide a direct indication of the porosity of the earth formation population by the epithermal neutrons.

Referring now to FIGURE 2–C, there may be seen another pulse diagram similar to that depicted in FIGURE 2–B, but showing a different detection sequence. In particular, detection interval D which encompasses the greater portion of the decline of curve 32, is shown to be only a portion of detection interval C which encompasses substantially all of curve 32. Thus, a ratio of the number of epithermal neutrons detected during interval D, to all or substantially all epithermal neutrons detected between any two successive fast neutron bursts from the accelerator source 6, may also be used to provide an indication of porosity which is independent of the total number of fast neutrons in the initiating burst.

Obviously, such a measurement cannot be made with the apparatus depicted in FIGURE 1, where the second detector 10 is maintained normally non-responsive, and where gate 14 is used to actuate the second detector 10 only during preselected time intervals. Instead, the second detector 10 must be maintained normally responsive (at least during detection interval C), and the output signal from the second detector 10 must be broken into two separate signals with respect to time.

Referring now to FIGURE 3–A, there may be seen a functional diagram of the major components in one form of the porosity signal circuitry 22 depicted in FIGURE 1, but where in the gate 14 and has been omitted and the second detector 10 is continually responsive to incident epithermal neutrons. Accordingly, the train of pulses constituting the output signal from the second detector 10 is conducted to the surface by means of conductor 19. There, the pulses are first passed through a conventional noise discriminator 40 which blocks out the low-amplitude noise pulses, and then the remaining pulses attributable to the detected epithermal neutrons are applied simultaneously to gates 42 and 44.

If it is sought to obtain the rate of decline of the epithermal neutron population as suggested in FIGURE 2–B, then the first gate 42 is preferably preset to open and to pass pulses only during detection interval A, and the second gate 44 is preferably preset to open and to pass pulses only during detection interval B. The outputs from the gates 42 and 44 may then be applied to count rate meters 46 and 48, respectively, and their output voltages may be applied to suitable ratio-taking circuit 50, for example a circuit such as that disclosed in the copending application S.N. 409,687, filed Nov. 9, 1964, by E. C. Hopkinson. The resulting voltage from the ratio circuit 50 is then recorded by the recorder 24 as hereinbefore described.

Alternatively, gate 42 may be preset to open during time interval C, as depicted in FIGURE 2–C, and gate 44 may be preset to open during time interval D. On the other hand, gate 44 may be removed entirely from the circuit depicted in FIGURE 3–A, and gate 42 may be preset to open during time interval D. Thus, the signal generated by the second count rate meter 48 will be continuously representative of the rate of detection of epithermal neutrons by the second detector 10, and the first count rate meter 46 will generate a signal representative of the count rate during detection interval D. The ratio of these two signals will also be representative of the porosity of the irradiated formation, and will be independent of neutron output rate from the accelerator source 6.

As was hereinbefore explained, it is common practice with equipment utilizing an artificial source of neutrons, to monitor the output of such apparatus and to transmit the monitor signal to the surface for observation and recording. Referring now to FIGURE 3–B, there may be seen conductors 19 and 39, which may be presumed to interconnect with the logging instrument 2, which carry the output signals from the second detector 10 and the monitor circuit (not depicted in FIGURE 2), respectively. The output signal from the second detector 10 is passed through a noise discriminator 41, and then is applied to gate 42 which is preset to pass pulses only during detection interval D, or some portion thereof. The pulses passing through gate 42 are then applied to the count rate meter 42 which generates a voltage representative of the number of epithermal neutrons detected during interval D, and this voltage is applied to ratio circuit 50.

The monitor signal on conductor 39 is also preferably passed through a conventional noise discriminator 43 to eliminate all noise pulses. Thereafter, the pulses representing the fast neutrons emitted by the accelerator source 6 are applied directly to a count rate meter 48 which, in turn, generates a voltage representative of the output rate of the accelerator source 6. This voltage is also applied to the ratio circuit 50, and the resulting signal from the ratio circuit 50 may be applied to the recorder 24 as hereinbefore explained.

It should be understood that fluctuations may occur in the pulse rate of the accelerator source 6. As long as such fluctuations are not so severe as to constitute complete interruptions in neutron generations, they may be ignored for purposes of the present invention. However, it should be clearly understood that gates 14, 42 and 44 are all actuable in synchronism with the pulsation of the accelerator source 6, and that the detection intervals shown in FIGURES 2–B and 2–C are preselected not only with respect to their durations, but also with respect to the commencement of the fast neutron burst generated by the accelerator source 6. In other words, if the fast neutron burst is one microsecond in duration, and if detection interval D commences 40 microseconds after the initiation of the fast neutron burst, then the delay interval between the termination of the detection interval D will be 39 microseconds in duration. Operation of the gates 14, 42 and 44 is preferably synchronized with the pulsation of the accelerator source 6; fluctuations in the rate of such pulsation might otherwise adversely affect the accuracy of the porosity measurement obtained with the present invention.

Numerous other variations and modifications may obviously be made in the structures and techniques herein described without departing from the basic concept of the present invention. Accordingly, it should be clearly understood that the forms of the invention described herein and shown in the figures of the accompanying drawings are illustrative only, and are not intended to limit the scope of the invention.

What is claimed is:

1. Method of radioactivity well logging comprising the steps of
    irradiating a subsurface earth formation with a pulse of fast neutrons,
    detecting and counting a representative number of epithermal neutrons emanating from said formation during a preselected time interval,
    counting a representative number of fast neutrons in said pulse of fast neutrons, and
    determining a functional relationship of said representative number of epithermal neutrons to said representative number of fast neutrons.

2. Method of radioactivity well logging comprising the steps of
    irradiating a subsurface earth formation with a pulse of fast neutrons,
    detecting and counting a representative number of epithermal neutrons emanating from said formation during a first preselected time interval,
    counting a representative number of epithermal neutrons emanating from said formation during a second preselected time interval which is a portion of said first time interval, and
    determining a functional relationship of the number of epithermal neutrons emanating from said formation during one of said intervals to the number of epithermal neutrons emanating from said formation during the other of said intervals.

3. Method of radioactivity well logging comprising the steps of
    irradiating a subsurface earth formation with a sequence of pulses of fast neutrons at preselected frequency,
    detecting epithermal neutrons emanating from said irradiated formation during each interval between each pair of fast neutron pulses,
    generating a first electrical signal functionally related to the number of said epithermal neutrons detected during said intervals between said fast neutron pulses,
    generating a second electrical signal functionally related to the number of said epithermal neutrons detected during a preselected portion of each of said intervals between said fast neutron pulses,
    generating in response to said first and second signals a third electrical signal functionally related to a functional relationship of the number of epithermal neutrons detected during each interval to the number of epithermal neutrons detected during each corresponding preselected portion of said each interval, and
    recording said third electrical signal together with a correlative indication of depth.

4. Apparatus for radioactivity well logging, said apparatus comprising
    a source of fast neutrons including means for pulsing said source,
    detector means for detecting and counting epithermal neutrons during a preselected time interval,
    monitor means for counting fast neutrons produced by said pulsed source of fast neutrons, and
    computing means for determining a functional relationship of epithermal neutrons counted by said detector means to fast neutrons counted by said monitor means during said preselected time interval.

5. Apparatus for radioactivity well logging, said apparatus comprising
    a source of fast neutrons including means for pulsing said source,
    detector means for generating electrical pulses in response to epithermal neutrons,
    counting means for counting electrical pulses generated by said detector means during a first preselected time interval and for counting electrical pulses generated by said detector means during a second preselected time interval, and
    computing means for determining a functional relationship of said electrical pulses generated during one of said intervals to said electrical pulses generated during the other of said intervals.

6. Apparatus for radioactivity well logging, said apparatus comprising
    a source of fast neutrons including means for pulsing said source,
    detector means for generating electrical pulses in response to epithermal neutrons,
    first counting means for counting electrical pulses generated by said detector means during a preselected time interval,
    second counting means for counting electrical pulses generated by said detector means during a preselected portion of said time interval, and
    computer means for determining a functional relationship of the number of electrical pulses counted by one of said first and second counting means to the number of electrical pulses counted by the other of said first and second counting means.

7. Apparatus for radioactivity well logging, said apparatus comprising
    a source of fast neutrons including means for pulsing said source at a preselected frequency,
    detector means for generating electrical pulses in response to epithermal neutrons during a preselected time interval between each pair of fast neutron pulses,
    first signal generating means for generating a first electrical signal comprised of the electrical pulses generated by said detector means during each preselected time interval,
    second signal generating means for generating a second electrical signal comprised of the electrical pulses generated by said detector means during a preselected portion of each such preselected time interval,
    third signal generating means for generating in response to said first and second electrical signals a third electrical signal indicative of a functional relationship of the number of pulses in said second signal to the number of pulses in said first signal during each such preselected time interval, and recording means for recording said third signal together with a correlative indication of depth.

8. Apparatus for radioactivity well logging, said apparatus comprising a source of fast neutrons including means for pulsing said source, detecting means for generating electrical pulses in response to epithermal neutrons, first counting means for counting electrical pulses generated by said detector during a first preselected time interval following each pulse of fast neutrons produced by said source, second counting means for counting electrical pulses generated by said detector during a second preselected time interval following each pulse of fast neutons produced by said source, and computing means for determining a functional relationship of the number of electrical pulses generated by said detector during one of said first and second time intervals to the number of electrical pulses generated during the other of said first and second time intervals.

9. Apparatus for radioactivity well logging, said apparatus comprising a source of fast neutrons including means for pulsing said source, detecting means for detecting a representative number of epithermal neutrons emanatnig from said formation during first and second preselected time intervals following each pulse of fast neutrons, first counting means for counting said epithermal neutrons detected during each such first preselected time interval, second counting means for counting said epithermal neutrons detected during each such second preselected time interval, and computer means for determining a functional relationship of the epithermal neutrons detected during one of said first and second time intervals to the epithermal neutrons detected during the other of said first and second time intervals.

10. Apparatus for radioactivity well logging, said apparatus comprising a source of fast neutrons including means for pulsing said source, detecting means for detecting a representative number of epithermal neutrons emanating from said formation during first and second preselected time intervals sequentially following each pulse of fast neutrons, first counting means for counting said epithermal neutrons detected during each such first preselected time interval, second counting means for counting said epithermal neutrons detected during each such second preselected time interval, and computer means for determining a functional relationship of the epithermal neutrons detected during one of said first and second time intervals to the epithermal neutrons detected during the other of said first and second time intervals.

References Cited

UNITED STATES PATENTS 3,133,195  5/1964  Jones et al. _____ 250—83.1

RALPH G. NILSON, Primary Examiner

A. B. CROFT, Assistant Examiner

U.S. Cl. X.R.

250—83.1, 83.6